United States Patent
Sato et al.

(10) Patent No.: US 8,094,601 B2
(45) Date of Patent: Jan. 10, 2012

(54) BASE STATION AND MOBILE STATION

(75) Inventors: Atsuhiko Sato, Yokohama (JP);
Sadayoshi Kiyo, Yokohama (JP);
Shinichiro Hayashi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 840 days.

(21) Appl. No.: 12/108,047

(22) Filed: Apr. 23, 2008

(65) Prior Publication Data

US 2009/0117898 A1    May 7, 2009

(30) Foreign Application Priority Data

May 17, 2007   (JP) .................. 2007-131893
Oct. 5, 2007   (JP) .................. 2007-262279

(51) Int. Cl.
*H04H 20/71* (2008.01)

(52) U.S. Cl. ..... 370/312; 370/329; 370/346; 455/435.1; 455/414.2; 455/456.2; 455/456.3

(58) Field of Classification Search ............. 455/435.1, 455/414.2, 456.2, 456.3; 370/329, 312, 346
See application file for complete search history.

(56) References Cited

U.S. PATENT DOCUMENTS

| | | | |
|---|---|---|---|
| 5,600,635 A * | 2/1997 | Hamaki et al. | 370/280 |
| 6,735,431 B1 | 5/2004 | Tsunami et al. | |
| 7,257,840 B2 * | 8/2007 | Ramaiah et al. | 726/22 |
| 2004/0152473 A1 * | 8/2004 | Kuwano et al. | 455/456.2 |
| 2008/0181163 A1 * | 7/2008 | Ye et al. | 370/312 |

FOREIGN PATENT DOCUMENTS

| | | |
|---|---|---|
| EP | 1 764 966 | 3/2007 |
| WO | WO 00/35209 | 6/2000 |

OTHER PUBLICATIONS

The Second Generation Cordless Telephone System, ARIN RCR STD—28 4.0 edition, pp. 66, 71, 70 and 86, Mar. 2002, Research & Development Center for Radio System.
3GPP2 C. S0084-002-0 version 2.0, pp. 3-5, Jul. 2007, $3^{Rd}$ Generation Partnership Peogect 2.

* cited by examiner

*Primary Examiner* — Dwayne Bost
*Assistant Examiner* — Amancio Gonzalez
(74) *Attorney, Agent, or Firm* — Antonelli, Terry, Stout & Kraus, LLP.

(57) ABSTRACT

Problems can be solved by a base station to which a location of a mobile station is registered and which performs a radio communication with the MS, and when receiving distribution information, divides the distribution information into N pieces, and incorporates the divided distribution information in N pieces of reception channels to successively transmit them to the MS. It can be achieved by a MS which is in a waiting state of a BS and which performs a radio communication with the BS, and when receiving distribution information which is incorporated in reception channels and divided, stores the distribution information, and when determining completion of the distribution of the distribution information, constructs the N pieces of divided information and displays it.

4 Claims, 12 Drawing Sheets

| FIELD | LENGTH (BITS) |
|---|---|
| LOAD CONTROL | 3 |
| NEW RELEASE INFORMATION | 35 |
| RESERVE | 6 |

| FIELD | LENGTH (BITS) | |
|---|---|---|
| LOAD CONTROL | 3 | ~701 |
| INFORMATION IDENTIFIER | 2 | ~702 |
| INFORMATION DIVISION NUMBER | 5 | ~703 |
| INFORMATION NUMBER | 5 | ~704 |
| DISTRIBUTION INFORMATION | 29 | ~705 |

710 720

BASE STATION AND MOBILE STATION

CLAIM OF PRIORITY

The present application claims priority from Japanese patent application serial no. 2007-131893, filed on May 17, 2007, Japanese patent application serial no. 2007-262279, filed on Oct. 5, 2007 and the contents of which are hereby incorporated by reference into this application.

BACKGROUND OF THE INVENTION

The present invention relates to a base station (BS) and a mobile station (MS) which perform information distribution in a mobile radio communication system structured by a BS and plural MSs.

In a mobile radio communication system, a reception channel is generally provided for paging a MS (incoming call).

Personal Handy phone System (PHS) is a mobile radio communications system using TDMA/TDD technology. In a PHS, one frame of 5 ms is divided into each four time slots of uplink and downlink communications. Of each four time slots of uplink and downlink communications, time slots used for transmission/reception of a control signal are one time slot of uplink and downlink communications, respectively. A time slot for transmission of control information structures a super frame of which cycle is 1.2 seconds. A super frame refers to the minimum cycle of a downlink Logical Control Channel (LCCH) which designates slot positions of all LCCH elements.

The downlink LCCH elements refer to a Broadcasting Control Channel (BCCH: information channel) used in the system, a Paging Channel (PCH: simultaneous paging channel) corresponding to all incoming calls, a Signaling Control Channel (SCCH: channel for individual cells) inserted in a fixed manner, and a User Specific Control Channel (US-CCH). The BCCH (A) is necessarily transmitted at the front slot of the LCCH super frame. However, any one of other LCCH elements may be stolen temporarily so that other LCCH elements are transmitted, as needed. The LCCH is stored in the downlink control time slot at a cycle of 5×n (ms) (wherein n is an interval value of the LCHH). For example, the LCCH interval value (n) in a PHS is 20, which is determined by the standard for public, therefore a BS transmits various control information at an interval of 100 ms. Paging information is transmitted to each incoming call at an interval of one super flame (1.2 seconds).

Even when there is no paging information, a BS transmits an idol PCH. A paging message sores information with 62-bit structure, such as an identification number of a receiving MS.

A USCCH is a User Packet Channel (UPCH) capable of being defined on a control physical slot. Herein, the UPCH is a bidirectional channel between a point and multiple points, which performs transmission of the user packet data. The USCCH is a voluntary option in a PHS as long as the USCCH satisfies the specified items. In addition, the USCCH includes USCCH (1) and USCCH (2), wherein the USCCH (1) includes an arrival identification code and arrives at a certain terminal while the USCCH (2) does not include an arrival identification code.

A BS and a MS are not dependent on a system in this specification. A BS and a MS in a PHS are referred to as a Cell Station and a Personal Station, respectively, which are hereinafter described as "CS" and "PS". On the other hand, a BS and a MS in a Ultra Mobile Broadband (UMB) are referred to as an Access Point and an Access Terminal, respectively, which are hereinafter described as "AP" and "AT".

A system in which information is distributed from a distribution center to a PS in PHS will be described with reference to FIG. 1. Herein, FIG. 1 is a block diagram illustrating the information distribution in a PHS. In FIG. 1, an information distribution system 100 in PHS is structured by a distribution center 10, an exchange device 20 (hereinafter, referred to as "EX"), a CS (Cell Station) 30, and PSs (Personal Stations) 70. In a conventional distribution method, a distribution center determines a simultaneous paging area where information is to be delivered and transmits the information to each PHS of which a location is registered in the simultaneous paging area. With reference to FIG. 1, it is assumed that there are four CSs of CS 30-1, CS 30-2, CS 30-3, and CS 30-4, in a certain simultaneous paging area 80. Eight PSs 70 are registered in the simultaneous paging area 80. When the distribution center 10 designates information distribution to the simultaneous paging area 80, each PS 70 of which a location is registered in the simultaneous paging area 80 is alerted. Therefore, the distribution center 10 transmits information to EX 20 in the simultaneous paging area 80, then EX 20 transmits a set up message incorporating the distribution information to all CSs in the area: CS 30-1, CS 30-2, CS 30-3, and CS 30-4. When receiving the set up message from the EX 20, each CS transmits a PCH to the PS 70 which is in a waiting state thereof.

As described above, a conventional distribution system is distribution in a unit of a simultaneous paging area unit. Accordingly, information distribution cannot be performed to a more limited area than a department store or the like. Furthermore, since the CS transmits the PCHs to as many as the number of PSs, the limited PCH resources are sometimes lacking, thereby resulting in a failure of arrival of a usual incoming call.

In a conventional distribution system, an information distribution sequence in which information is distributed from a distribution center to a PS will be described with reference to FIG. 2. Herein, FIG. 2 is a sequence diagram illustrating information distribution among a distribution center, an EX, CSs, and PSs.

In FIG. 2, the distribution center 10 transmits information to the EX 20 in a simultaneous paging area designated as a distribution destination (T201). When receiving the information, the EX 20 transmits a setup message incorporating the distribution information to CSs 30 (note that only the CS 30-1 and the CS 30-2 are illustrated for simplification of the drawing) arranged in the simultaneous paging area (T202, T204). When receiving the set up message from the EX 20, the CS 30-1 and the CS 30-2 transmit the PCH to PSs (note that only PS 70-1 and PS 70-3 are illustrated) which is in a waiting state thereof (T203, T206). When confirming that an incoming call number of the received PCH is identical with its own number, the PS 70-3 transmits an LCH establishment request to the CS 30-2 (T207), and transmits/receives a message for connecting a Traffic Channel (TCH). The CS 30-2 transmits a set up message (LCH Assignment) incorporating distribution information to the PS 70-3 (T208).

When the PS 70-3 fails to receive the information because of any cause occurring between the CS 30-2 and the PS 70-3, the CS 30-2 sometimes attempts to transmit the information again; however, in the case of a further failure, the PS 70-3 cannot take this distribution information. In addition, since a TCH is used for distributing information, the PS 70-3 sometimes cannot perform a usual transmission because of lack of TCH. Furthermore, the battery of the PS 70-3 is exhausted by transmitting/receiving a message for performing TCH connection between the PS 70-3 and the CS 30-2. T209 to T224 are usual procedures, such as paging response, authentication, call connection, and call disconnection, thus explanation regarding these procedures will be omitted.

The case of PHS has been described above; however, this description can be adopted in other mobile radio systems, even in a system with a reception function. A UMB is a mobile radio communication system using Orthogonal Frequency Division Multiplexing Access/Frequency Division Duplex (OFDMA/FDD) technology. There is a message for paging an incoming call even in the UMB and when there is no incoming call, an idle message for incoming call is transmitted. In the UMB, what is called the PCH in PHS is referred to as a Quick Page Channel (QPCH), and what is called the TCH is referred to as a Data Channel (DCH).

"The second generation cordless telephones system, ARIB RCR STD-28 4.0 edition, pages: 66, 71 and 86, March, 2002, Research & Development Center for Radio System" describes the definition of the USCCH, a super frame structure of the downlink LCCH, and a structure of the USCCH (2) which is a physical expansion slot.

"3GPP2 C. S0084-002-0 version 2.0, 3-5 pages, July, 2007, 3RD GENERATION PARTNERSHIP PEOGECT 2" describes how to use a reception channel in a UMB system.

In the above information distribution method, a short message is transmitted to each PS to be targeted in the area. To transmit a short message to a PS, all CSs belonging to a simultaneous area transmit PCHs. In the case where there are many PSs to be targeted, the number of transmissions of PCHs increases in accordance therewith, thus the limited PCH resources may be insufficient. In the case, a usual incoming call sometimes fails to arrive because of lack of PCH resources. When the first message failed to be received, the message can be transmitted again; however, the retransmission thereof may fail again because of an adverse influence by a radio wave environment, resulting in a failure that the PS does not take the distribution information.

Each CS and each PS connect TCHs thereof together and perform a short message distribution on the TCH. Therefore, when distributing information, the number of the TCH traffics increases, resulting in that a usual transmission sometimes cannot be performed because of lack the TCH resources or the like. In addition, it is counted as one usual incoming call because the information distribution is performed on the TCH. As a result, the battery is more exhausted than that in a usual waiting state.

The distribution center designates a simultaneous paging area where the information is to be distributed and distributes the information to each PS of which a location is registered in the area. Therefore, the information distribution is performed in a wider unit of so-called a simultaneous paging area, resulting in failure of distribution to a more limited area than a department store or a store or the like.

In the above information distribution method, each CS and each PS connect their TCHs together and perform information distribution on the TCH. Accordingly, it is counted as one usual incoming call; thereby the battery is more exhausted than that in a waiting state. When there is a lot of distribution information, much of the battery is exhausted.

The above problems are the same as UMB.

SUMMARY OF THE INVENTION

The above stated problems can be solved by a BS which performs a radio communication between MSs of which locations are registered and when receiving distribution information, divides the distribution information into N pieces and incorporates the divided distribution information in the N pieces of reception channels to transmit the divided information successively to the MSs.

The above stated problems can also be solved by a MS which is in a waiting stage of a BS and performs a radio communication between the BS and when receiving divided distribution information incorporated in reception channels from the BS, stores the distribution information, and when determining completion of distribution of the divided distribution information, constructs the N pieces of the distribution information and displays it.

BRIEF DESCRIPTION OF THE DRAWINGS

Preferred embodiments of the present invention will now be described in conjunction with the accompanying drawings, in which:

FIG. 11 is a sequence diagram illustrating information distribution among the information distribution center, the AP control device, the AP and the AT;

FIG. 12 illustrates a field structure of a QPCH;

FIG. 13 illustrates a field structure in information distribution using the QPCH.

DESCRIPTION OF THE PREFERRED EMBODIMENTS

Figure 1:
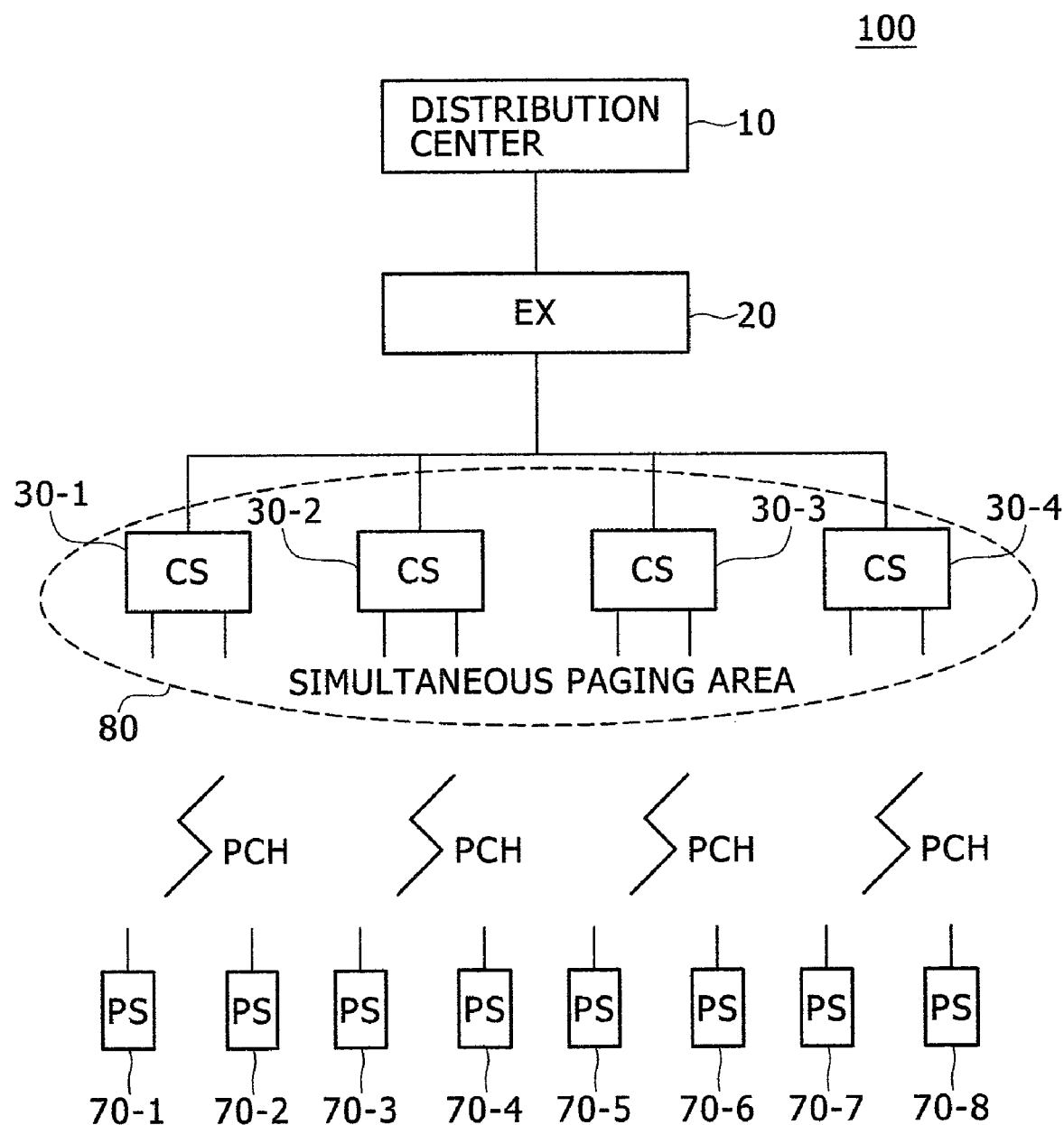
FIG. 1 is a block diagram illustrating information distribution in PHS.
Figure 2:
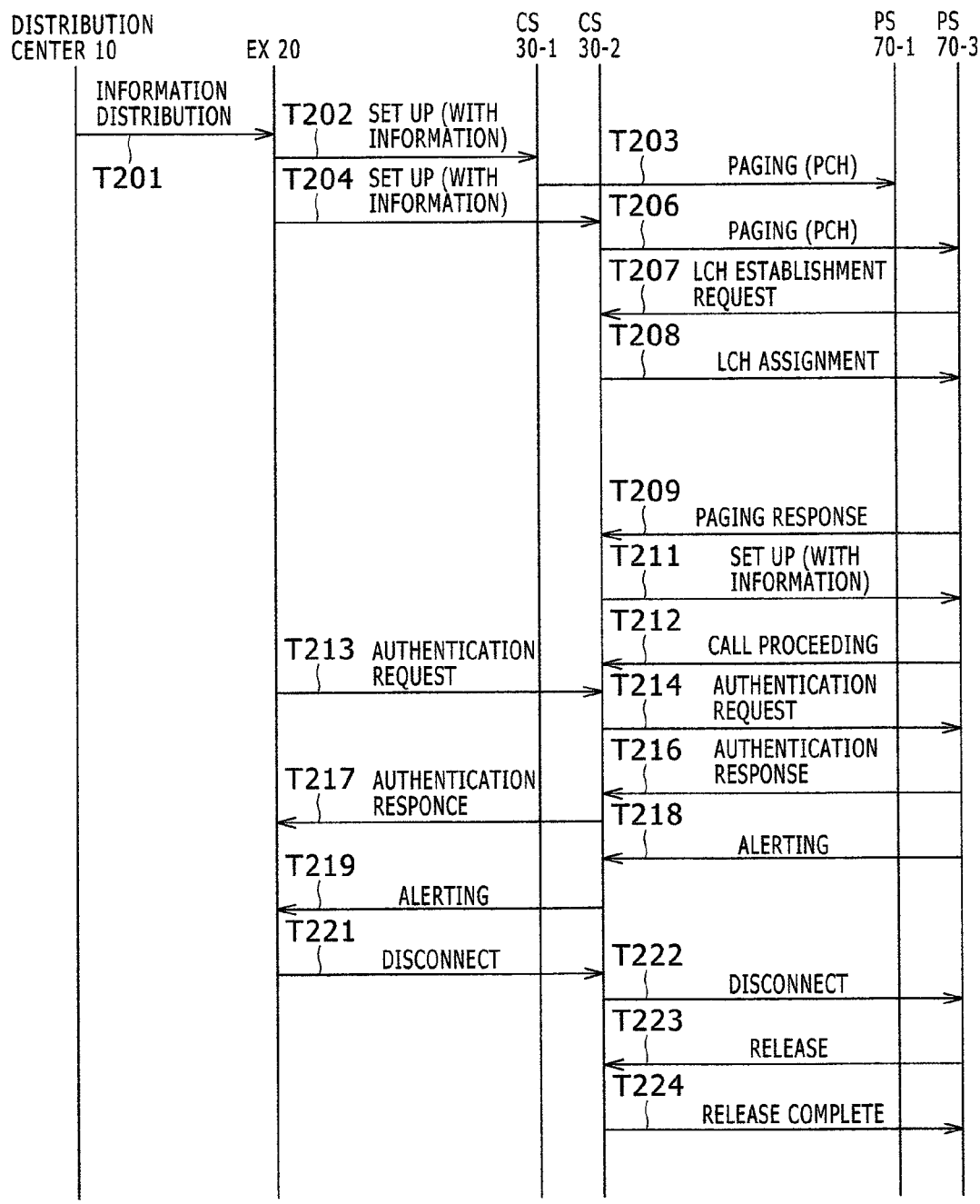
FIG. 2 is a sequence diagram illustrating information distribution among a distribution center, an EX, CSs, and PSs.

The preferred embodiments will be described below using examples and with reference to the accompanying drawings. Like parts are denoted by like reference numerals and description will not be repeated again.

Embodiment 1

Embodiment 1 will be described with reference to FIGS. 3 to 9.

Figure 3:
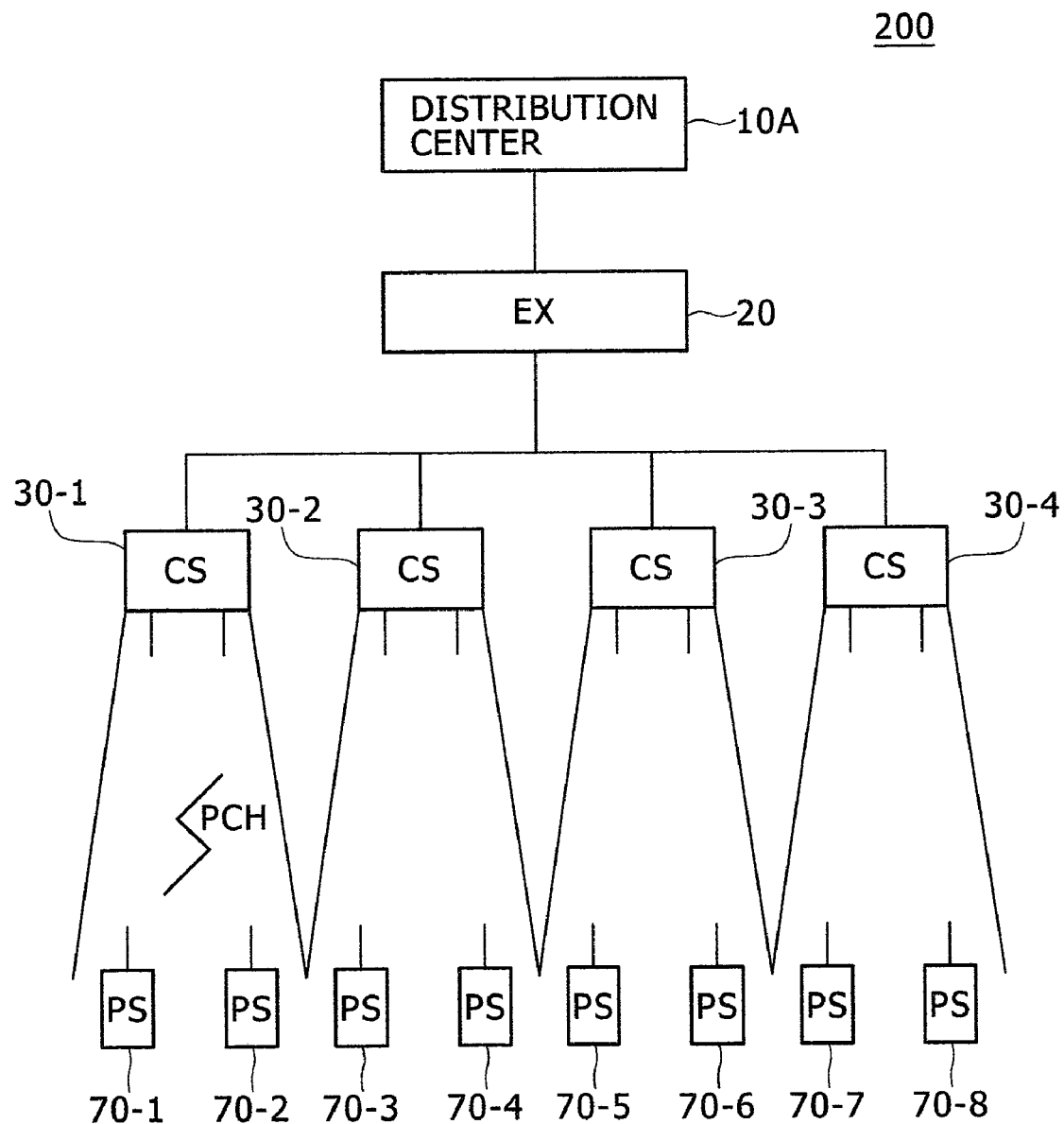
FIG. 3 is a block diagram illustrating information distribution in PHS.

A system in which information is distributed from the distribution center to the PSs in a PHS will be described with reference to FIG. 3. Herein, FIG. 3 is a block diagram illustrating information distribution in a PHS. In FIG. 3, an information distribution system 200 in a PHS is structured by a distribution center 10A, the EX 20, CSs 30, and PSs 70. In an information distribution system 200, the distribution center 10A identifies the CSs to be distribution destinations and transmits information to the identified CS 30-1 via the EX 20. The CS 30-1 alerts the PS 70-1 and PS 70-2 which belong to the CS 30-1 and are in a waiting state thereof. Upon receiving information distribution from the EX 20, the CS 30-1 divides the information into N pieces and transmits the N pieces of information incorporated in N pieces of USCCH (2), to the PS 70-1 and the PS 70-2. Note that N is a positive integer (natural number) and "division by 1" means "no division".

Figure 4:
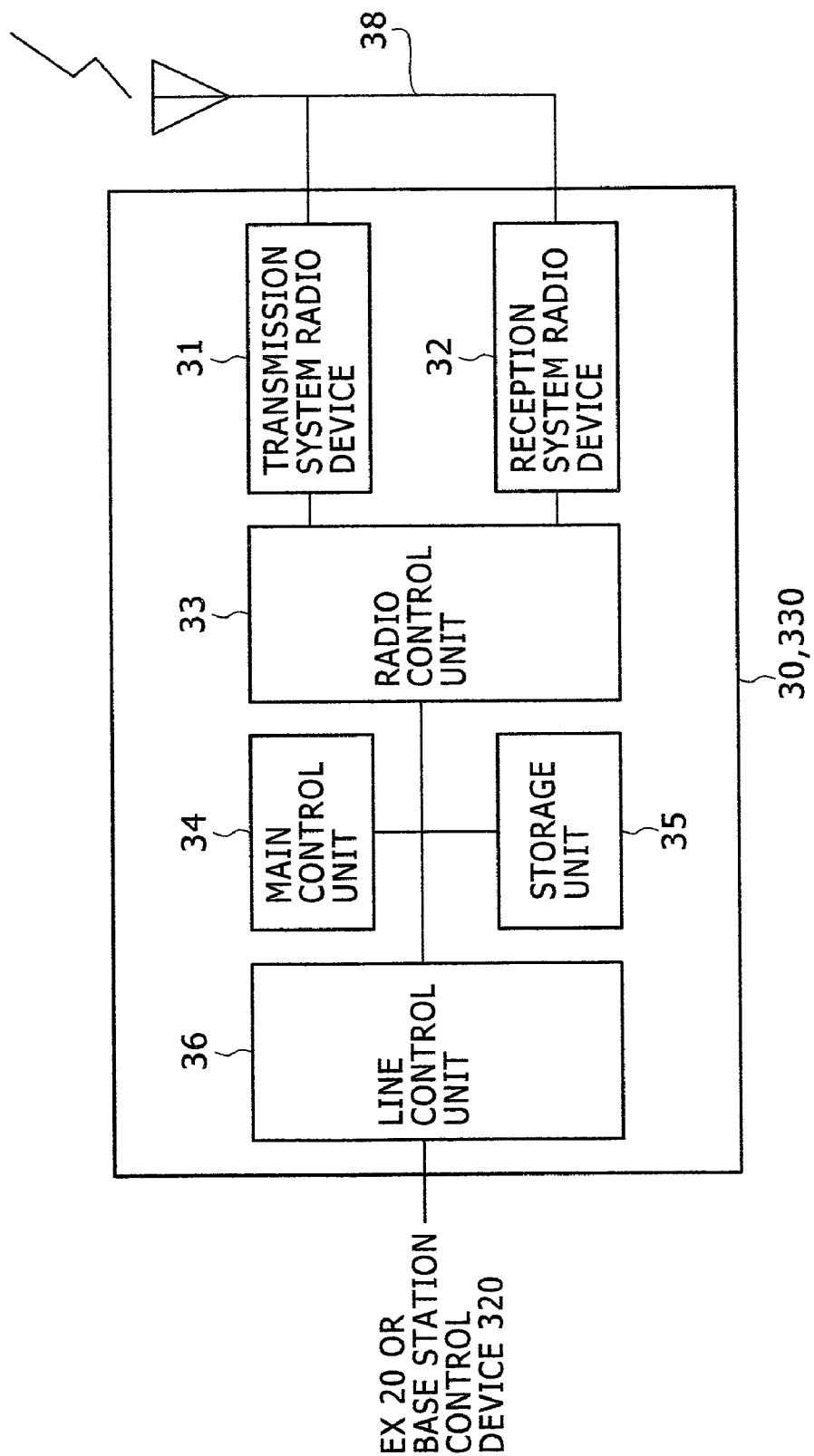
FIG. 4 is a functional block diagram of a CS.

The structure of the CS will be described with reference to FIG. 4. Herein, FIG. 4 is a functional block diagram of the CS. In FIG. 4, the CS 30 includes a transmission system radio device 31, a reception system radio device 32, a radio control unit 33, a main control unit 34, a storage unit 35, a line control unit 36, and an antenna 38. The main control unit 34 stores the distribution information received from the EX 20 by the line control unit 36 in the storage unit 35. After measuring the timing of an idle transmission of the PCH, the main control unit 34 divides the information stored in the storage unit 35 and takes out the divided information successively to forward to the radio control unit 33. The radio control unit 33 forwards the received information to the transmission system radio device 31. After RF modulating the received information, the transmission system radio device 31 transmits it from the antenna 38.

Figure 5:
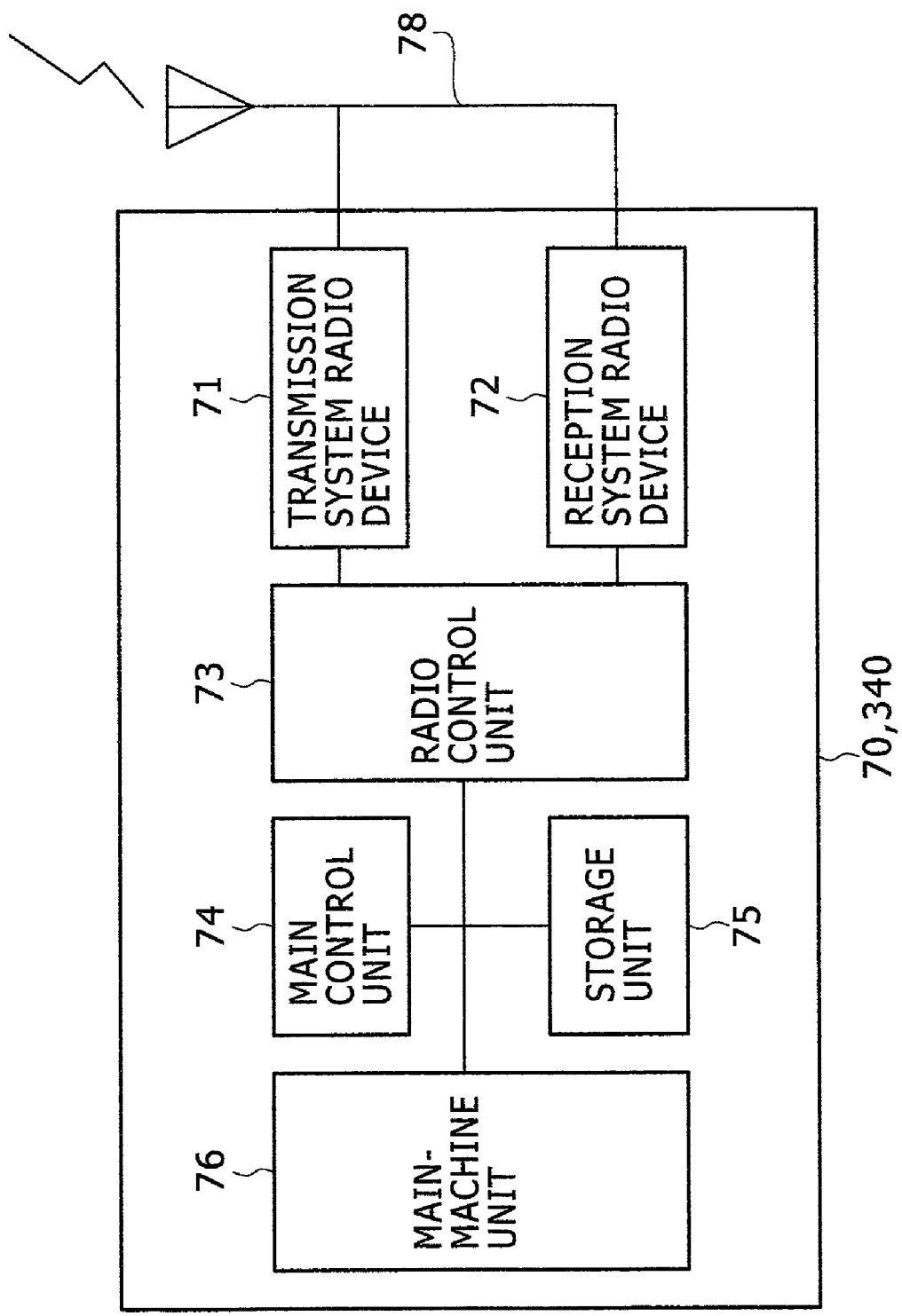
FIG. 5 is a functional block diagram of a PS.

The structure of the PS will be described with reference to FIG. 5. Herein, FIG. 5 is a functional block diagram of the PS. In FIG. 5, the PS 70 includes a transmission system radio device 71, a reception system radio device 72, a radio control unit 73, a main control unit 74, a storage unit 75, a man-machine IF unit 76, and an antenna 78. The man-machine IF unit includes a display unit, a key input unit, and a sound output unit and the like. The main control unit 74 stores the divided distribution information received from the CS 30 by the radio control unit 33 via the antenna 38 and the reception system radio device 32, in the storage unit 75. Upon detecting completion of distribution of the divided distribution information, the main control unit 74 constructs the divided distribution information stored in the storage unit 75, and displays the constructed distribution information on the man-machine IF unit 76.

An information distribution sequence among the distribution center, the EX, the CS and the PS will be described with reference to FIG. 6. Herein, FIG. 6 is a sequence diagram illustrating information distribution among the distribution center, the EX, the CS and the PS.

Figure 6:
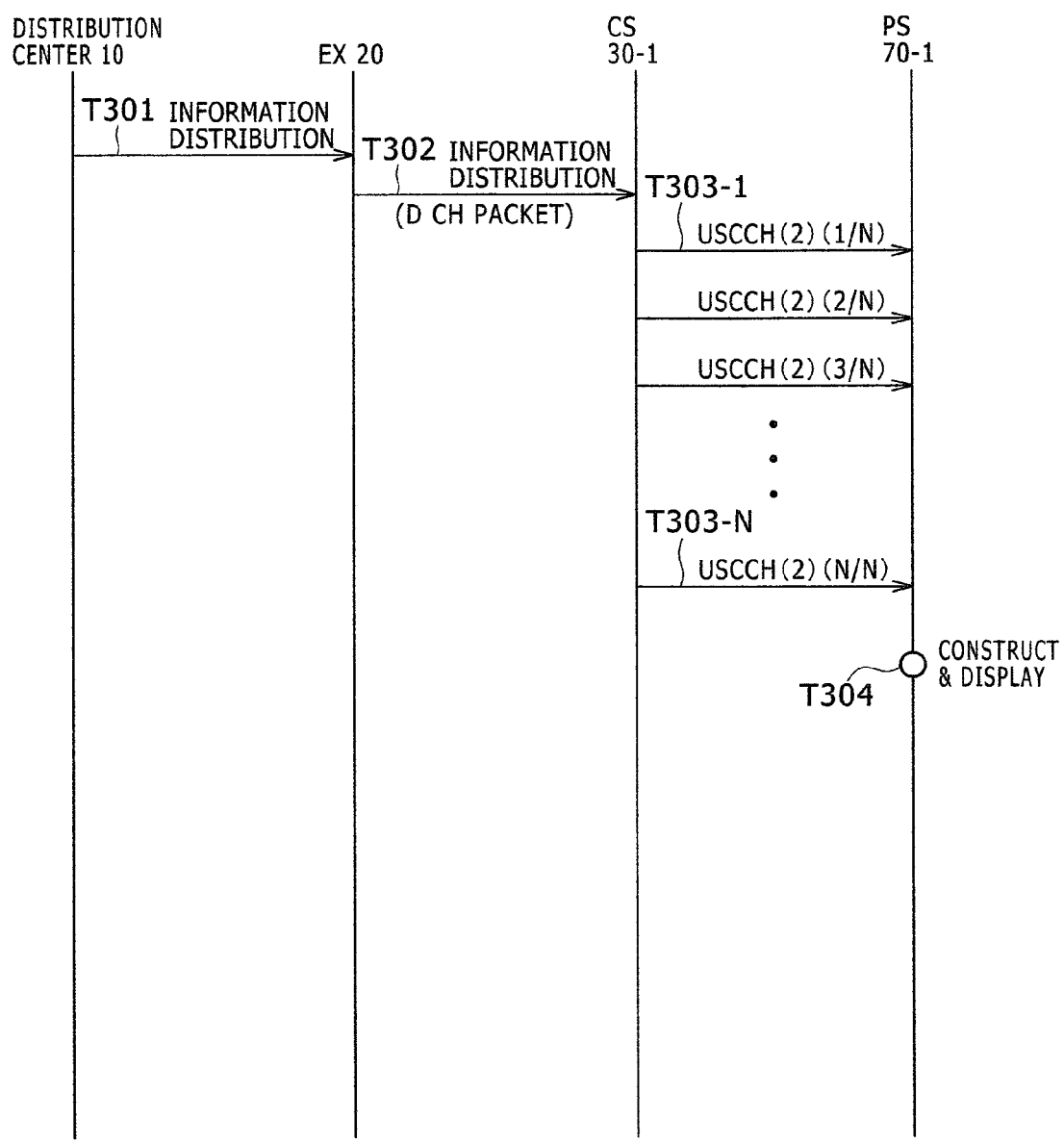
FIG. 6 is a sequence diagram illustrating information distribution among a distribution center, an EX, the CS, and the PS.

In FIG. 6, the distribution center 10A transmits the distribution information to the EX 20 as well as the information capable of identifying the CS (T301). The EX 20 identifies the CS 30-1 based on the distribution information and distributes the information to the CS 30-1 using Dch packet (T302). The CS 30-1 accumulates the received distribution information and divides the distribution information every 62 bits into N pieces which can be transmitted by a USCCH (2), to transmit the control channels in N cycles of procedures (T 303-1 to T 303-N). When receiving all USCCH (2), the PS 70-1 constructs the divided information and displays it (T304).

In the information distribution system 200, the distribution center 10A distributes information to each CS based on information of a CS, not distributes information to each PS. Therefore, the distribution center 10A stores information, such as CS-ID, CS number, with which a CS can be identified. Information is distributed between the EX 20 and the CS 30 with the use of the existing Dch packet. Based on information of the CS 30, the distribution center 10A at first distributes information to the EX 20 to which the CS 30 is registered. The EX 20 relays the distribution information received from the distribution center 10A, only to the designated CS 30 with the information being incorporated in a Dch packet. When receiving the distribution information, the CS 30 stores the information until the next new information is received. When there is an idle PCH, the CS 30 steals the PCH and incorporates the distribution information in the USCCH (2) to transmit to the PS 70. If the distribution information cannot be incorporated in a single USCCH (2), the CS 30 divides the information then transmits it. The PS70 stores the divided information until all the divided information is received, and when all the information is received, the PS 70 constructs the divided information and displays it.

Figure 7:
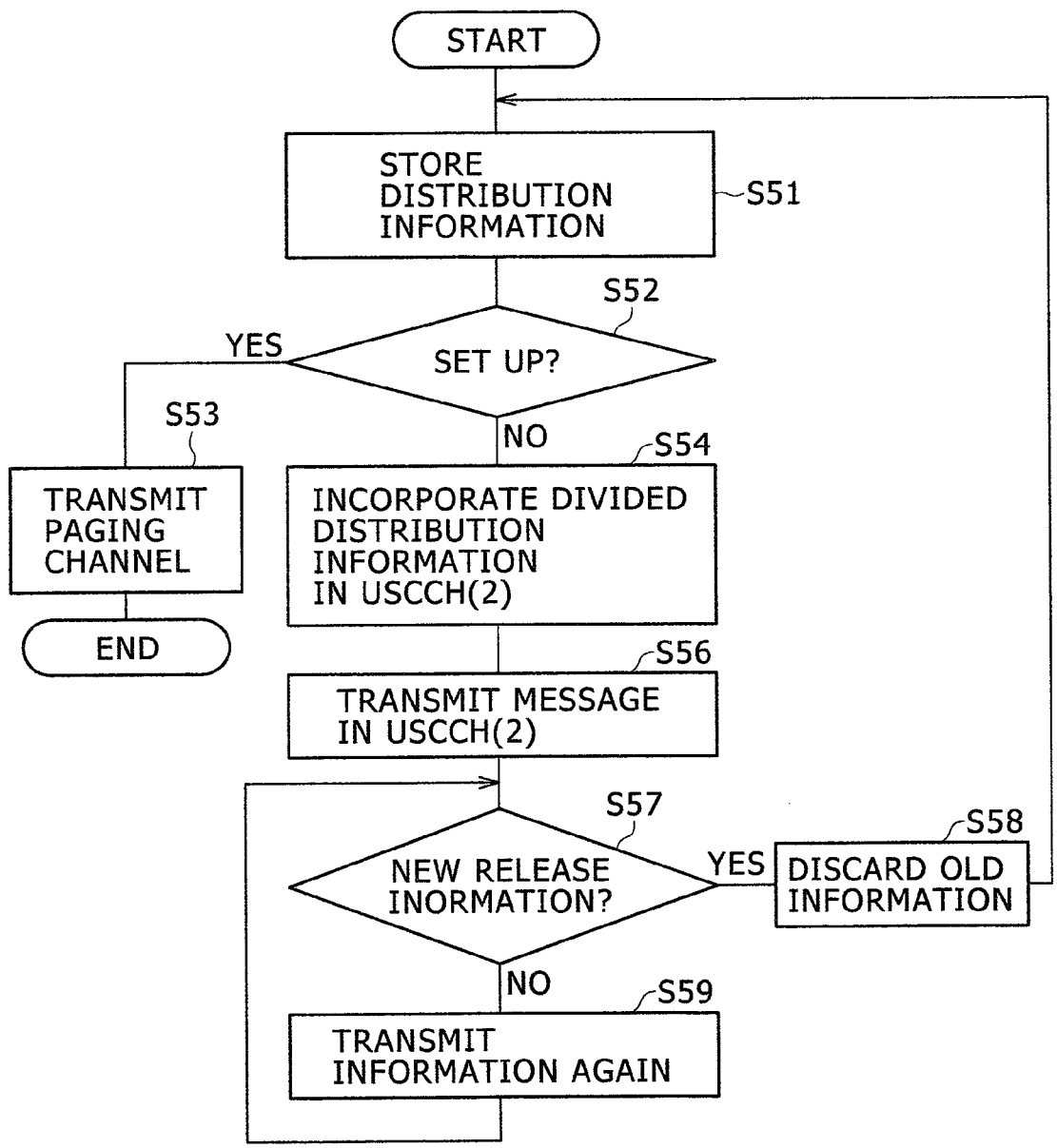
FIG. 7 is an operation flow chart of the CS.

An operation flow of the CS will be described with reference to FIG. 7. Herein, FIG. 7 illustrates an operation flow of the CS. In FIG. 7, when receiving the distribution information from the distribution center 10A, the CS 30 at first stores it in its own memory (S51). The CS 30 determines whether the distribution information is accompanied by a call set up or not (S52). When a usual call setup arrives from a network (S52: YES), the CS 30 transmits a PCH and connects the call (S53). When there is no call setup from a network (NO), the CS 30 steals an idol PCH and incorporates the divided distribution information in USCCH (2) (S54) to transmit it N times (S56). The CS 30 then determines whether or not the next new release information has been received from the information distribution center (S57). When it is YES, the CS 30 discards the old information (S58), and returns to step 51. When it is NO in step 57, the CS 30 transmits the information again (S59). Step 59 includes step 54 and step 56 and returns to step 57. That is, when there is no new release information, the CS 30 repeats transmitting the stored information. This is because the CS 30 makes a PS 70 which failed to receive the information last time, and a PS which has newly moves to the distribution area of the CS 30, display the information.

Figure 8:
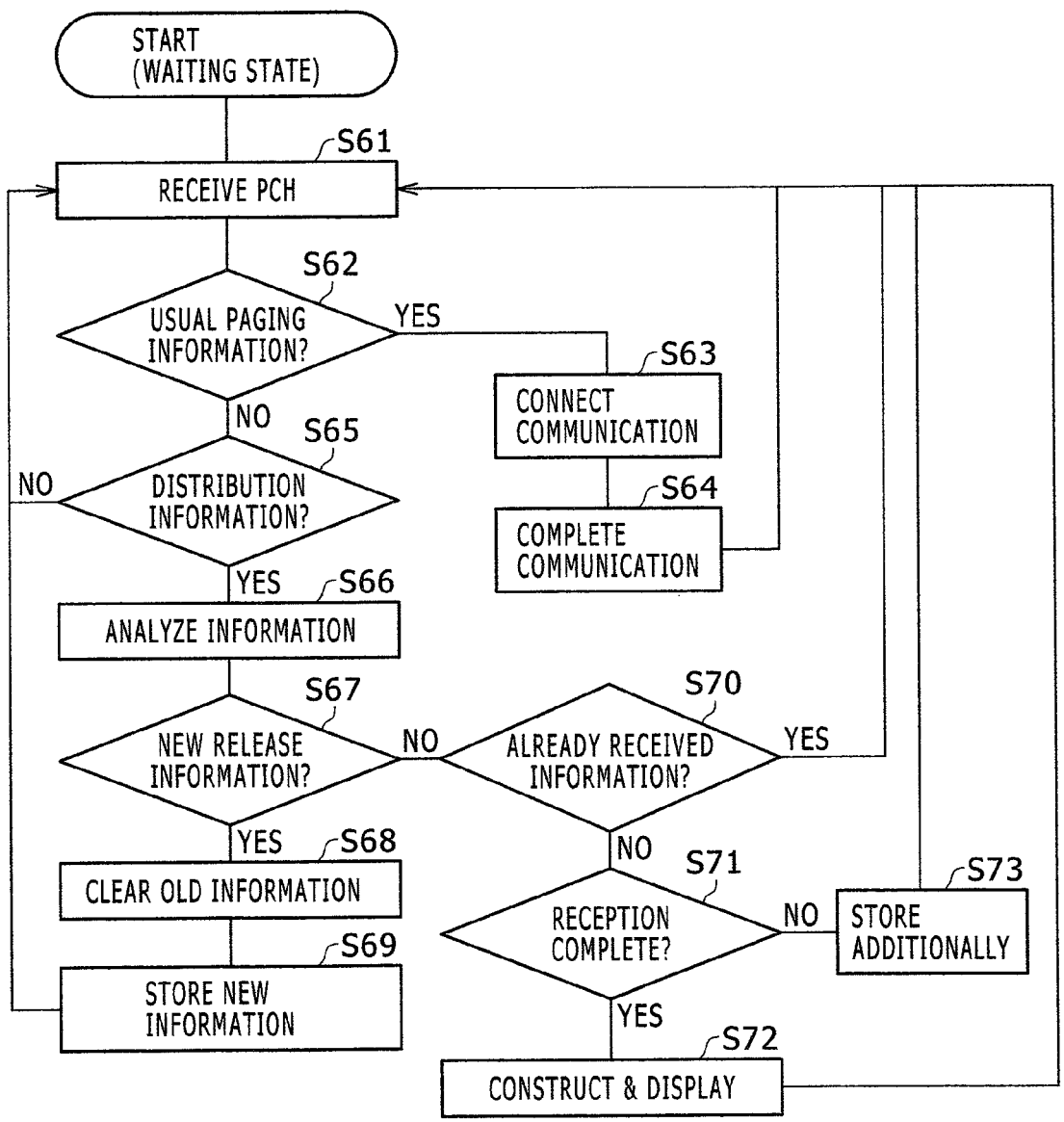
FIG. 8 is an operation flow chart of the PS.

An operation flow of the PS will be described with reference to FIG. 8. Herein, FIG. 8 illustrates an operation flowchart of the PS. In FIG. 8, the PS 70 which belongs to a certain CS 30 and is in a waiting state, receives a PCH at the intervals of 1.2 seconds (S61). When receiving a usual paging information (S62: YES), the PS 70 connects a communication (S63), and when completing the communication (S64), the PS makes a transition to the waiting state of PCH information again (S61). When it is NO in step 62, the PS 70 determines whether there is distribution information or not (S65). When it is YES, the PS 70 analyzes the distribution information (S66). As a result of the analysis, the PS 70 determines whether or not the received distribution information is the new release information (S67). When it is YES, the PS 70 clears all the old information stored by then (S68), and starts storing the new release information (S69). When it is NO in step 65, the PS 70 makes transition to step 61.

Conversely, when the received distribution information is not the new release information (NO) in step 67, the PS 70 determines whether the information has already been received or not (S70). Note that determination of whether the information is the new release information or not, or of whether the information has already been received or not, is made with reference to an information identifier (described later) of the distribution information. When the information has already been received, the PS 70 makes a transition to step 61 directly. That is, the distribution information is discarded. When it is NO in step 70, the PS 70 determines whether reception of the information has already completed or not (S71). When it is YES, the PS 70 constructs all the information stored by then and displays it (S72). When reception of the information has not already completed (NO in step 71), the PS 70 stores the information additionally (S73) and makes a transition to step 61.

Figure 9:
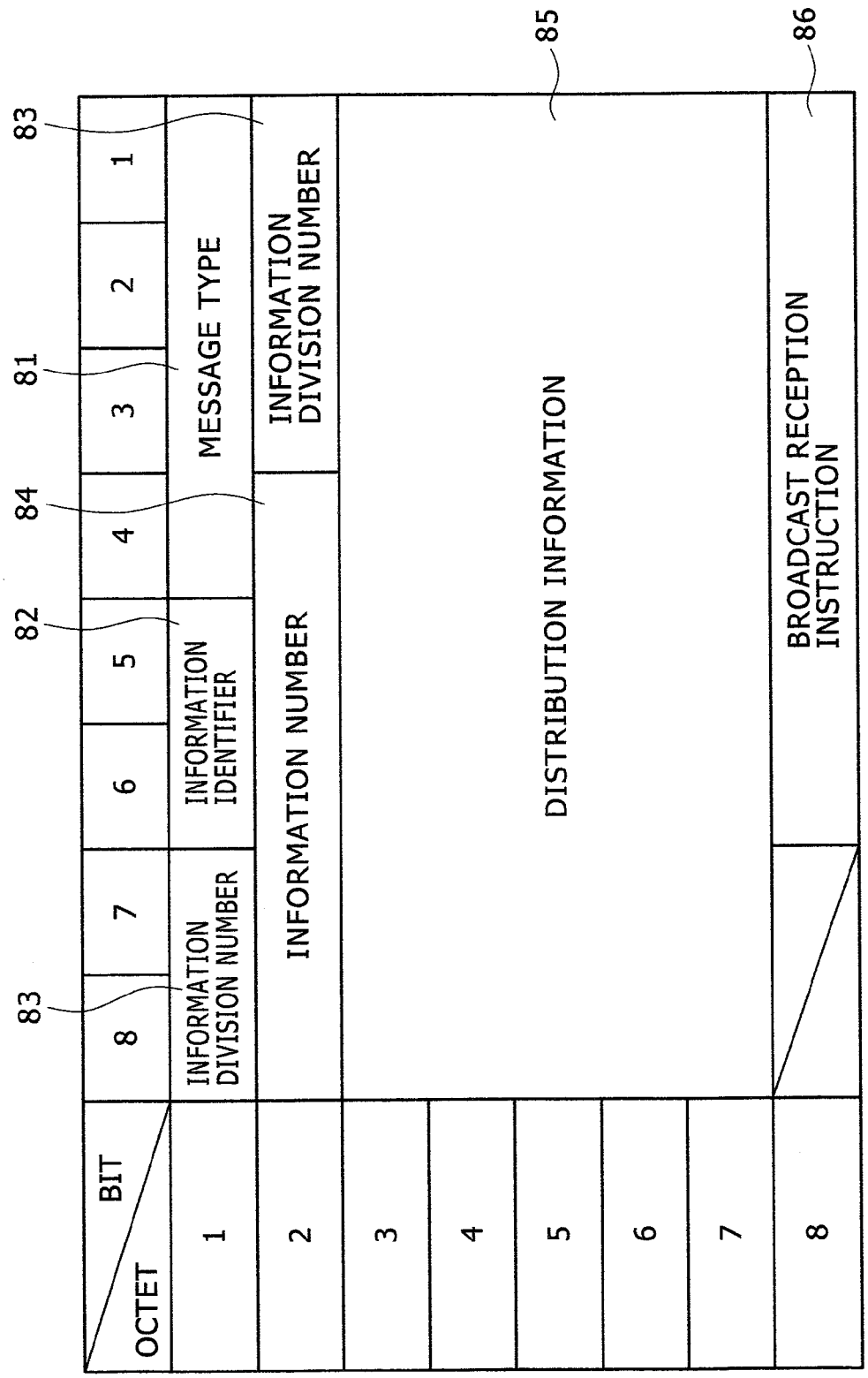
FIG. 9 is a message format of a USCCH (2)

A USCCH (2) message will be described with reference to FIG. 9. Herein, FIG. 9 is a message format of the USCCH (2). In the present embodiment, the CS 30 divides a distribution message and transmits them to the PS. Accordingly, when receiving distribution information from the distribution center 10, the CS 30 needs to determine into how many parts the distribution information should be divided in accordance with its length. In FIG. 9, information elements incorporated in a single USCCH (2) is 7 bytes, i.e., 56 bits in total. Among them, it is assumed that the first to fourth bits of the first octet are assigned to a message type 81, the fifth and sixth bits thereof to the information identifier 82, the seventh and eighth bits thereof and the first to third bits of the second octet to the information division number 83, the fourth to eighth bits of the second octet to the information number 84, and the third to seventh octets to the distribution information 85. Herein, the message type 81 is an information element for distinguishing itself from the services which the CS 30 provides, because it is assumed that the CS 30 provides plural services using the USCCH (2). The information identifier 82 is a 2-bit information element which the distribution center provides for distinguishing the distribution information. The information division number 83 is the number of divisions into which the distribution information that CS 30 receives from the distribution center 10 is divided in accordance with its length. Since the maximum length of user information that the PS 70 can receive at a time is 131 octets, and the maximum length of distribution information that the CS 30 can transmit at a time is 5 octets, the information division number needs to be equal to or more than 131/5, that is, 27, accordingly, the length of the information division number 83 is set to 5 bits (1 to 32). The information number 84 is used when the CS 30 transmits the divided information with serial numbers being added to in order of being divided. Accordingly, the value of the information number 84 is equal to the value of the maximum information division number 83, thus the length thereof is set to 5 bits.

According to the present embodiment, lack of the PCH resources can be avoided and a failure of an usual incoming call can be suppressed because the CS utilizes a PCH in an idle state. The possibility of the PS's failure to receive distribution information can be reduced because the CS repeats distributing information. A failure in transmitting information caused by lack of TCH can be reduced by avoiding the use of TCH in information distribution. Individual clients' needs (for example, a department store provides an advertising information distribution service with visiting customers) can be dealt with because information distribution can be performed to a more limited area from the distribution center. Moreover, the battery exhaustion of the PS can be suppressed.

Embodiment 2

Embodiment 2 will be described with reference to FIGS. 10, 13, 4, 5, 7, and 8.

Figure 10:
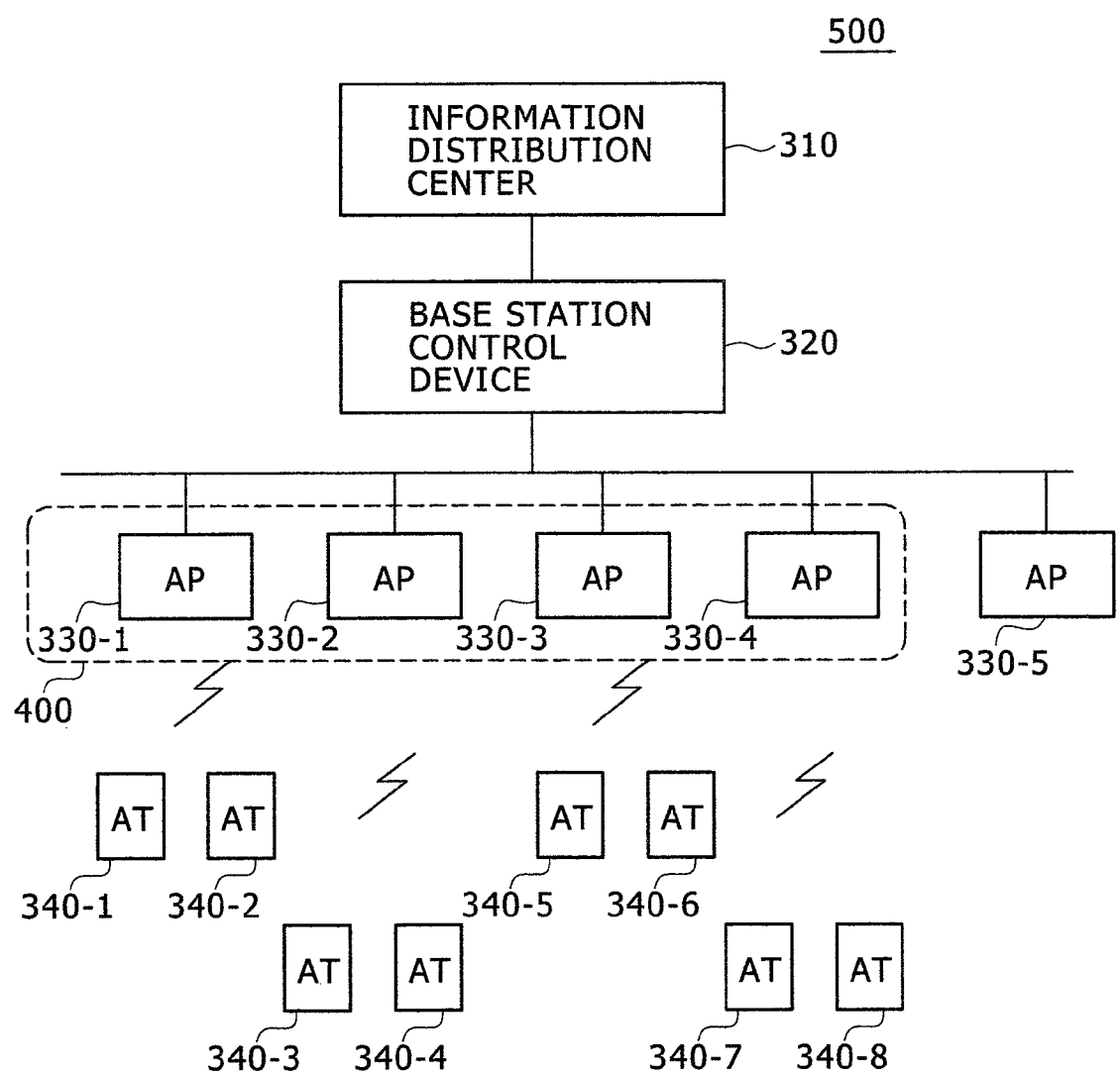
FIG. 10 is a block diagram illustrating information distribution of a UMB.

FIG. 10 is a diagram illustrating a system in which information is distributed from a distribution center to a MS in the UMB. A basic system structure of the UMB is structured by an AP (Access Point) which is a BS, an AT (Access Terminal) which is a MS, and a base station control device which accommodates the AP. In the information distribution system 500, the information distribution center 310 identifies a distribution destination AP and transmits information to an AP 330-1 to an AP 330-4 belonging to the identified distribution destination group 400 via the base station control device 320. The AP 330-1 to the AP 330-4 alert the ATs 340 which belong thereto and are in waiting mode. Upon receiving the information distribution from the control device 320 of the AP, the AP 330-1 to the AP 330-4 divide the information into N pieces and transmit the N pieces of information, which are incorporated in N Quick Page Channels (QPCHs), to the AT 340-1 to the AT 340-8. Note that N is a positive integer (natural number) and "division by 1" means "no division".

The structure of the AP will be described with reference to FIG. 4. Herein, FIG. 4 is a functional block diagram of the AP and the line control unit is connected to the AP control device 320.

The structure of the AT will be described with reference to FIG. 5. Herein, FIG. 5 is a functional block diagram of the AT.

Figure 11:
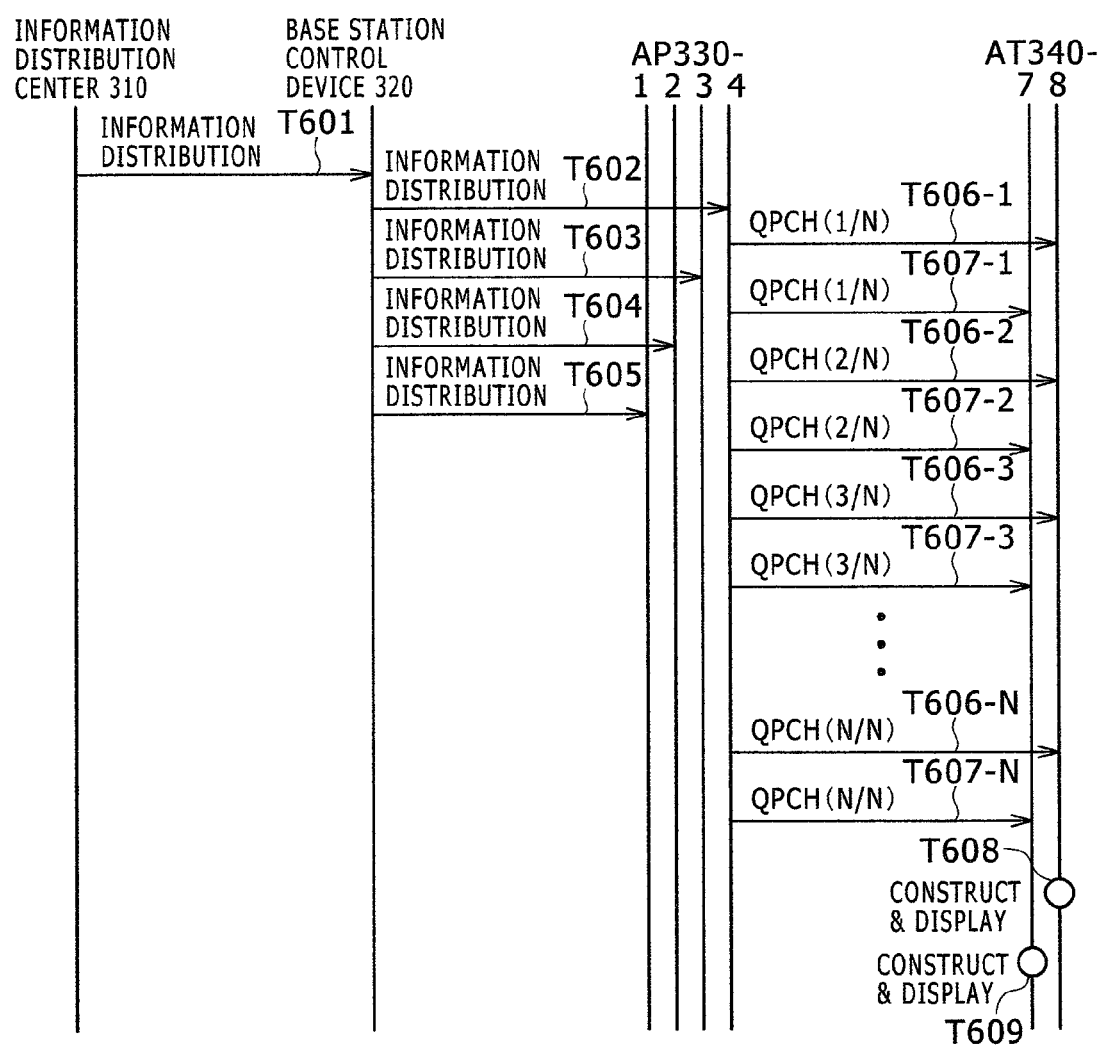

An information distribution sequence among the information distribution center, the AP control device, the AP and the AT, will be described with reference to FIG. 11. Herein, FIG. 11 is a sequence diagram illustrating information distribution among the information distribution center, the AP control device, the AP and the AT. Note that only the AT 340-7 and the AT 340-8 which are in a waiting state of the AP 330-4 are illustrated as the AT for simplification of the drawing.

In FIG. 11, the information distribution center 310 transmits distribution information to the AP control device 320 as well as the information capable of identifying an AP (T601). The AP control device 320 identifies the AP 330-1 to the AP 330-4 based on the distribution information, and distributes information to the AP 330-1 to the AP 330-4 using an IP packet (T602 to T605). The AP 330-4 accumulates the received distribution information and divides the information every 29 bits into N pieces, which can be transmitted by a QPCH, to transmit the distribution information in N cycles (T606-1 to T607-N). Upon receiving all QPCHs, the AT 340-7 and the AT 340-8 construct the divided information and display it (T608, T609).

In the information distribution system 500 of the present embodiment, the information distribution center 310 distributes information to each AP based on the information of the AP instead of distributing information to each AT. Therefore, the information distribution center 310 stores information such as an IP address, an administrative ID, with which an AP can be identified. Information is distributed between the AP control device 320 and the AP 330-1 to the AP 330-4 with the use of an IP packet for controlling the AP. The information distribution center 310 at first distributes information to the AP control device 320 to which the APs are registered, based on the information of the AP 330-1 to the AP 330-4. The AP control device 320 relays the distribution information received from the information distribution center 310, only to the designated AP 330-1 to AP 330-4. Upon receiving the distribution information, the AP 330-1 to the AP 330-4 stores the information until the next new information is received, and when there is an idle QPCH, the AP 330-1 to the AP 330-4 incorporate the distribution information in the QPCP to transmit it to the AT 340-1 to the AT 340-8. If the distribution information cannot be incorporated in a single QPCH message, the information is transmitted after being divided. The AT 340-1 to the AT 340-8 stores the divided information until the reception of the information is completed, and upon receiving all information, the AP 330-1 to the AP 330-4 construct the divided information and display it.

An operation flow of the AP will be described with reference to FIG. 7. FIG. 7 is an operation flowchart of the CS, accordingly only the difference will be described. In FIG. 7, the AP 330 transmits a QPCH in step 53. The AP 330 incorporates distribution information in a QPCH after dividing the information in step 54, and transmits the distribution information by the QPCH in step 56.

An operation flow of the AT will be described with reference to FIG. 8. Herein, FIG. 8 is an operation flowchart of the PS, accordingly only the difference will be described. In FIG. 8, the AT 340 which belongs to a certain AP 330 and is in a waiting state receives a QPCH at a certain interval in step 61.

The QPCH will be described with reference to FIG. 12. Herein, FIG. 12 is a message format of the QPCH. The QPCH message format 700 is structured by a Field 710 and a Length 720. In detail, it is structured by a 3-bit Load Control, a 35-bit received information, and a 6-bit reservation.

The case where distribution information is incorporated in the QPCH will be described with reference to FIG. 13. FIG. 13 illustrates a message format in the case where distribution information is incorporated in the QPCH. Herein, the AP 330 divides the distribution message into N pieces and transmits them to the AT 340. Accordingly, upon receiving the distribution information from the information distribution center 310, the AP 330 needs to determine into how many parts the QPCH should be divided in accordance with the length of the distribution information. In FIG. 13, the amount of information which can be incorporated in a single QPCH is 44 bits in total. The content thereof is 3 bits the for Load Control 701, 2 bits for the information identifier 702, 5 bits for the information division number 703, 5 bits for the information number 704, and 29 bits for the distribution information.

The information identifier 702 is a 2-bit information element which is added by the distribution information center 310 to identify the distribution information. The information division number 703 is the number of divisions into which the distribution information received by the AP from the information distribution center 310 should be divided in accordance with the length thereof. In the case of this format, the length of distribution information which the AT can receive at a time becomes 29 bits×32 divisions=928 bits=116 bites. The information number 704 is used when the AP transmits the divided information with serial numbers being added to the information in order of being divided.

According to the present embodiment, the same advantages as those of a PHS can be obtained. The lack of the resources can be avoided and a failure of a usual incoming call caused thereby can be suppressed because a QPCH in an idle state is utilized instead of using a data channel in information distribution. The possibility of the AT's failure to receive distribution information can be reduced because the AP repeats distributing information. A failure in connection caused by lack of data channels can be reduced by avoiding the use of data channels in information distribution. When applying to a small-sized BS, such as a femto cell, individual clients' needs (for example, a department store provides an advertising information distribution service with visiting customers) can be dealt with because the information distribution center can performs information distribution to a limited area with an AP being designated. Moreover, the battery exhaustion of the AT can be suppressed because reception of data is performed only when radio reception is performed only when monitoring an incoming call, that is, a radio communication is not carried out just for receiving data.

According to the present invention, in a mobile radio communication system, information distribution can be performed with the use of a reception channel.

What is claimed is:

1. A base station which performs a radio communication with a mobile station, and which transmits idle paging channels in case where there is no distribution information to the mobile station, said base station comprising:
    a radio control unit for receiving distribution information which is distributed from a distribution center to an exchange device with information to identify the base stations to be distribution destinations, and which is distributed from the exchange device to the base stations based on the information to identify the base stations; and
    a main control unit for detecting an idle paging channel, dividing said distribution information into N pieces, incorporating the divided information in N pieces of reception channels which do not include an arrival identification code, and sequentially transmitting said N pieces of reception channels to the mobile station instead of the idle paging channels, in case where said radio control unit receives the distribution information.

2. The base station according to claim 1,
further comprising a storage unit,
wherein said main control unit stores the distribution information in the storage unit, and until a new distribution information is received, repeats dividing the distribution information into N pieces, incorporating the divided information in N pieces of reception channels, and transmitting the N pieces of reception channels to the mobile station instead of the idle paging channels.

3. A mobile station which is in a waiting state to the base station according to claim 1, wherein the mobile station comprising:
    a radio control unit for receiving a plurality of divided distribution information which are incorporated in reception channels, which do not include an arrival identification code, instead of idle paging channels, and
    a main control unit for storing said plurality of divided distribution information, determining completion of reception, constructing distributed information, and displaying the distributed information in case where said radio control unit receives the plurality of divided distribution information.

4. The mobile station according to claim 3,
wherein in a case where: said radio control unit receives a plurality of divided distribution information which are incorporated in reception channels, which do not include an arrival identification code, instead of idle paging channels, and said main control unit refers to an information identifier of the divided distribution information and determines that the divided distribution information has already been received,
then said main control unit discards the divided distribution information.

* * * * *